(12) United States Patent
Rivola

(10) Patent No.: US 6,607,691 B1
(45) Date of Patent: Aug. 19, 2003

(54) VERSATILE METHOD FOR MANUFACTURING CERAMIC TILES OF DIFFERENT FORMATS

(75) Inventor: Pietro Rivola, Imola (IT)

(73) Assignee: SACMI-Cooperativa Meccanici Imola-Soc. Coop. A R.L., Imola (IT)

( * ) Notice: Subject to any disclaimer, the term of this patent is extended or adjusted under 35 U.S.C. 154(b) by 0 days.

(21) Appl. No.: 09/688,179

(22) Filed: Oct. 16, 2000

(51) Int. Cl.[7] ................................................ B28B 3/00
(52) U.S. Cl. ........................................ 264/678; 264/680
(58) Field of Search ................................ 264/678, 680, 264/644

(56) References Cited

U.S. PATENT DOCUMENTS 5,568,391 A * 10/1996 Mckee ................... 364/469.01
5,637,030 A *  6/1997 Chopra et al. ................. 451/39

FOREIGN PATENT DOCUMENTS

| EP | 0 684 340 A | 11/1995 |
|---|---|---|
| FR | 517 397 A | 5/1921 |
| FR | 1 104 039 A | 11/1955 |
| FR | 2 111 813 A | 6/1972 |
| GB | 880 892 A | 10/1961 |
| JP | 60 092404 A | 5/1985 |

OTHER PUBLICATIONS

Kahlman, L. et al.: "Wear and Machining of Engineering Ceramics by Abrasive Waterjets," American Ceramic Society Bulletin, American Ceramic Society, Columbus, OH, U.S., vol. 72, No. 8, Aug, 1, 1993, pp. 93–98.

* cited by examiner

*Primary Examiner*—Christopher A. Fiorilla
(74) *Attorney, Agent, or Firm*—Birch, Stewart, Kolasch & Birch, LLP

(57) ABSTRACT

A highly versatile method for manufacturing ceramic tiles of different formats, a plant for its implementation, and tiles obtained thereby includes the following operational stages. First, a single panel is dry-formed within a ceramic mold by compressing at least one ceramic material in powder form. At least two tiles are then separated from said panel, after the formation of the panel but before a firing process of said panel. The plant for implementing the method incorporates a press of relatively large power with which there is associated a single-exit ceramic mold arranged to form a starting panel of large dimensions, and at least one sectioning unit provided downstream of the press to obtain at least one tile of the desired format from said starting panel.

5 Claims, 11 Drawing Sheets

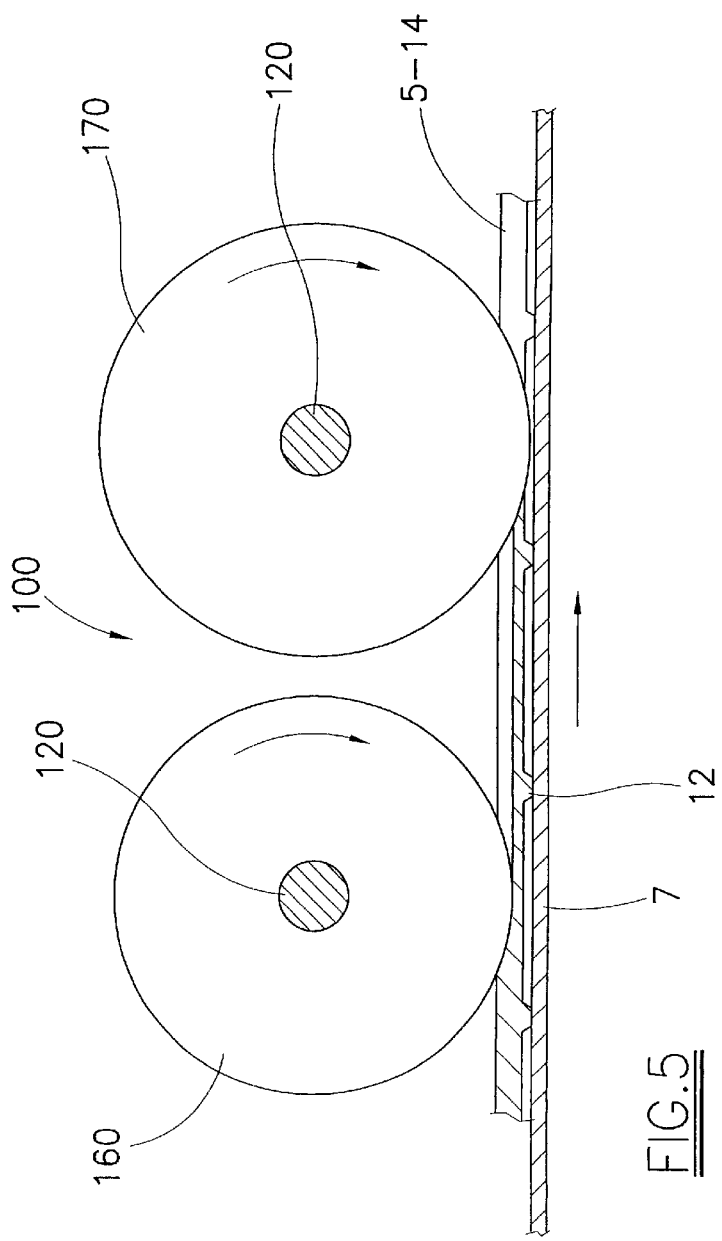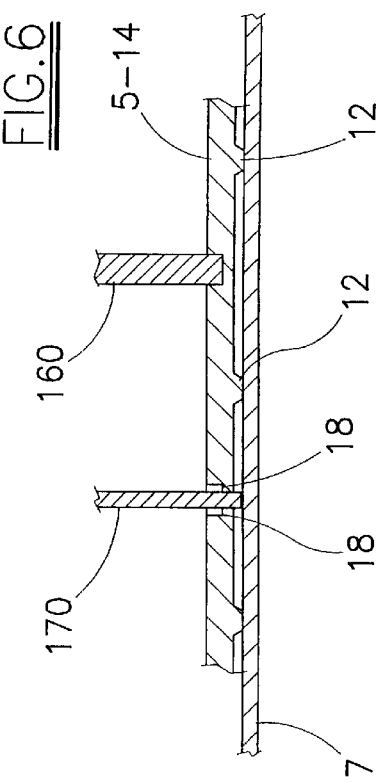

VERSATILE METHOD FOR MANUFACTURING CERAMIC TILES OF DIFFERENT FORMATS

This invention relates generally to ceramic tile manufacture.

More particularly, the invention relates to the production of ceramic articles by a production system usually known as a dry system, ie by pressing at least one ceramic material in powder form having a low moisture content, of the order of 3–7%.

More specifically, the invention concerns a manufacturing method, and its means of implementation, by which within one and the same production stage prior to firing, tiles of even considerably different formats can be obtained.

To form said tiles by the dry method it is known to use specific ceramic moulds having one or more forming cavities, depending on the required tile dimensions.

In the case of small formats the forming cavities are arranged in two or more adjacent rows extending transversely to the tile discharge direction.

To vary the tile format, the mould has always to be changed.

For this purpose the mould is removably positioned on a respective operating press having a power adequate for the production underway.

With the press there is also associated a loading unit (for at least one material in powder form) which if the mould is changed also has to be changed, or at least adjusted.

The widespread use of such a manufacturing system has highlighted various drawbacks, of which the following can be mentioned.

The presence, within one and the same works, of presses of different power and forming moulds for producing tiles of different formats results in a considerable initial cost plus ongoing costs for their maintenance and fitting.

Moreover, the need to change the moulds each time the format is to be changed, with consequent changing, or at least adjustment, of the discharge unit associated with the respective press, results in a loss of production, this being particularly negative economically considering the high production rates which characterise modern production cycles.

In addition, when using moulds for tiles of relatively small format, in the form of two or more adjacent rows of forming cavities, it is normally necessary to reduce the press operating speed, and it is quite common to encounter unwanted interference between the tiles directed to discharge.

Finally, a production system using the dry method is known in which slabs of relatively large format are formed by pressing at least one powdered ceramic material, to be then fed to the next stages of the production cycle, fired and finally transformed into tiles having the required dimensions and shape.

This system has however proved unsatisfactory because the transformation requires a relatively very lengthy operating time, it results in particularly rapid wear of the means used for the transformation, and consumes relatively very high absorbed power.

The main object of this invention is to provide a method, as defined in claims 1 to 18, and the relative plant for its implementation, as defined in claims 19 to 35, by which the aforesaid problems are eliminated.

According to a first aspect of the invention, the method comprises the following operational stages: forming within a mould, by dry-compressing at least one ceramic material in powder form, a panel of relatively large dimension, then separating from said panel, after its formation but before its firing, at least one tile having the desired format.

Preferably the panel is dimensioned to comprise a multiple of a given tile format plus the scrap deriving from said separation.

In a variant, the panel dimensions are such as to provide at least two tiles of different format plus the scrap.

According to a preferred embodiment, the starting panel is of right form, for example square or rectangular, in a variant the panel having the shape of a regular polygon, such as a lozenge, rhombus or hexagon.

Said separation comprises at least one cutting operation, said at least one cutting operation being performed by a mechanical means.

Alternatively, said at least one cutting operation is performed by a fluid means, such as air or water under high pressure, with a fine strongly abrasive material preferably mixed with it.

Again, said at least one cutting operation can comprise a first stage of surface incision, and a second stage of actual cutting.

Preferably said cutting, or said surface incision stage, includes the simultaneous formation, along the entire length of the sharp edges of said incision, of a profiled edge having the characteristics and function of the usual edging on the exposed face of a tile.

The same cut can also provide for forming, along the total length of the lower ends of the sides of the cut, small projections functioning as the usual spacers provided along the sides of a tile.

A network of small grooves is preferably formed on the rear face of the panel during its pressing, in correspondence with the lines along which said cuts are made.

The cuts themselves are made in directions parallel to at least one main directrix of the starting panel, for example one side thereof.

Preferably, the cuts are orientated along two mutually perpendicular horizontal directions, typically the direction parallel to the panel discharge direction and the direction perpendicular thereto, although other different directions, rectilinear or non-rectilinear, can be chosen, as will be apparent hereinafter.

Finally, in a first embodiment, said separation takes place immediately after forming the panel in the press, whereas in a further embodiment, separation takes place after at least partial drying of the panel.

According to a second aspect of the invention, the means for implementing the aforesaid method comprise a press of large power, such as a hydraulic or mechanical press, with which there is associated a single-exit ceramic mould arranged to form a starting panel of large dimensions, and at least one sectioning unit provided downstream of said press to obtain from said starting panel at least one tile of the desired format.

Said at least one sectioning unit is associated with a conveyor for removing the panels discharged from the mould, and comprises at least one cutting tool arranged to divide the panel into at least two equal or non-equal parts.

Said at least one cutting tool can be located in a fixed position above the moving conveyor, in such a manner as to cut the panel while it advances on this latter.

Alternatively, the said tool can be made to traverse across the at that moment stationary panel in any direction, as explained hereinafter.

In a first embodiment, said at least one cutting tool comprises a single element of horizontal axis, such as a diamond-set wheel or a disc blade with inserted teeth.

Alternatively, said at least one cutting tool can consist of a vertical nozzle delivering a fluid under high pressure, such as air or water.

Preferably a highly abrasive fine powder, such as powdered glass, sand, powdered metal, ground tile powder, industrial diamond particles or the like, is mixed with the fluid.

Alternatively, said at least one cutting tool comprises two members, such as two diamond-set wheels or two disc blades of horizontal axis, positioned in succession along the cutting direction, one of which incises the upper surface of the panel to a greater or lesser depth, and the other completes its cutting.

The incision tool is preferably thicker than the cutting tool, and is preferably shaped to create an edging along the upper sharp edges of the cut.

Typically for obtaining tiles of relatively small format, the means of the invention comprise two sectioning units, each provided with at least one cutting tool of the stated type, the units being positioned in succession along the panel advancement direction.

Said two units are arranged to operate along two different horizontal directions, for example mutually perpendicular, typically parallel to and perpendicular to said advancement direction respectively.

Advantageously, if the cutting tool is a nozzle or, alternatively, at least one cylindrical or conical motorized cutter or wheel of vertical axis as clarified hereinafter, said tool can be under the control of a robotized system which can operate with the panel either temporarily at rest or in movement.

The means of the invention can also be provided with a device for at least partially drying the panel before subjecting it to said sectioning.

Finally, it should be noted that the invention also comprises the tiles obtained by said method and said means or plant.

From the aforegoing, it is apparent that all the objects are attained, in that:
  tiles with even considerably different formats can be obtained from one and the same mould and a single press,
  it is not necessary to change the mould when the tile format changes, or to change or adjust the discharge unit associated with the press, and
  when tiles of relatively small format are produced, there is no undesirable interference between them.

Moreover as the panel is sectioned after its pressing, or at most after at least its partial drying, ie before firing, the cutting means used have a relatively long useful life, the power absorbed by them is fairly low, and their operating time is acceptable, as has been found by specific tests carried out with plants in accordance with the teachings of the invention.

The various stages of the method, and the characteristics and constructional merits of its respective means of implementation, will be apparent from the ensuing description given with reference to the accompanying drawings, on which:

FIG. 5 is an enlarged view of part of the section V—V of FIG. 4.

FIG. 6 shows part of the section VI—VI of FIG. 4.

Figure 1:
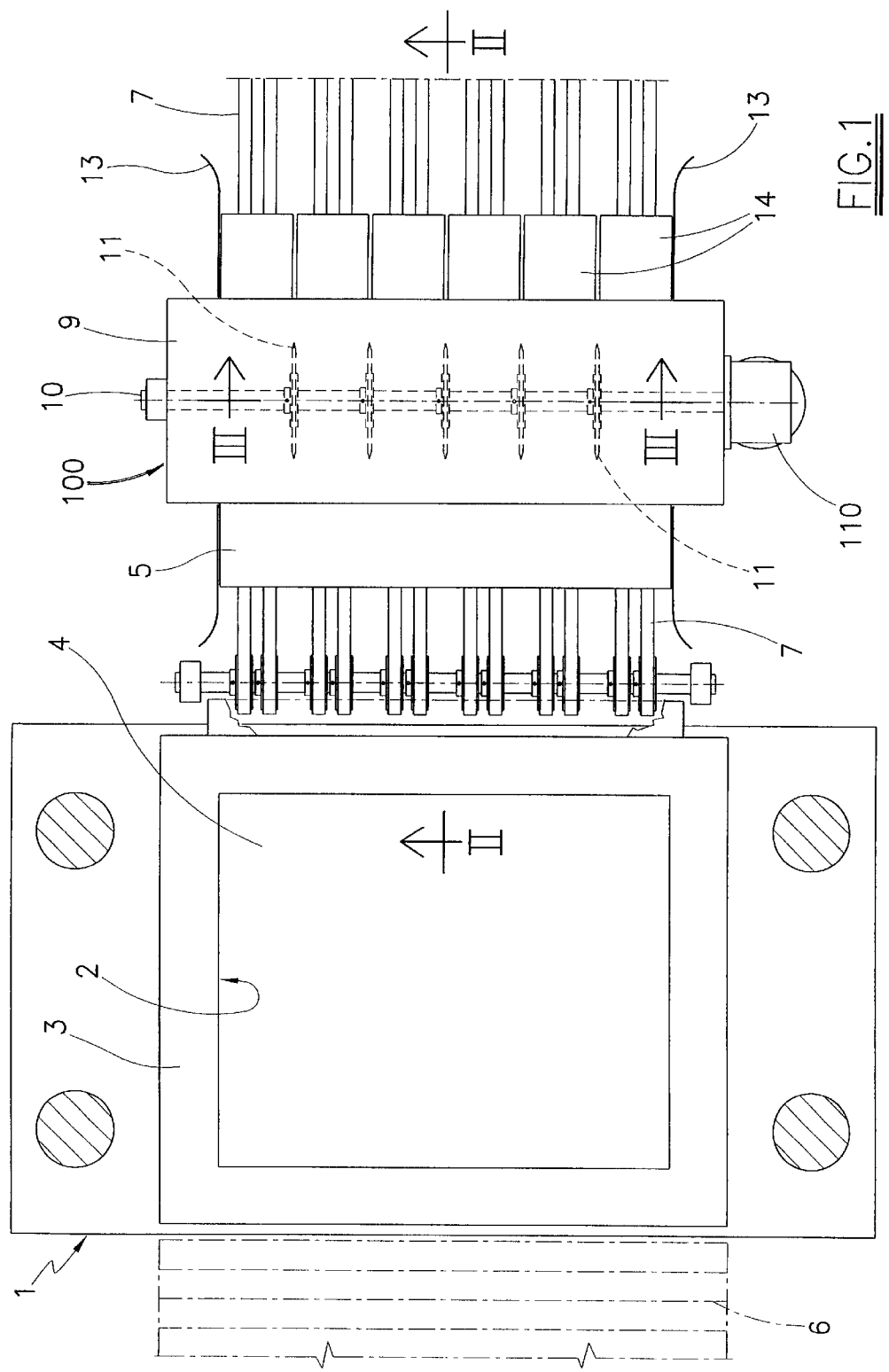
FIG. 1 is a schematic view from above showing a first embodiment of the means (or plant) of the invention.

Said figures, and in particular FIG. 1, show a ceramic press 1 carrying a single-exit ceramic mould, ie having only one forming cavity 2, FIG. 1 showing, of said mould, only the die plate 3 and the reverse face punch, ie that which presses the rear (or laying) face of the panel 5.

The press 1 can be of any known type suitable for the purpose, for example hydraulic or mechanical.

The die plate 3 can be of any known type, for example of the punch-entering type or of the type which moves in level during pressing, its forming cavity 2 being of particularly large dimensions, of up to 1200×1600 mm, or up to 1000–2000 mm.

The aforestated dimensions are purely indicative in that the invention is suitable for use on any panel 5 obtained by dry-pressing at least one powdered material within a ceramic mould.

To load said at least one powdered ceramic material, there is associated with the press 1 a loading unit 6 which in FIG. 1 is shown only schematically, it being of usual type.

On the opposite side of the press 1 a conveyor 7 is provided to remove the panels 5, it being shown as of the type comprising V-belts, these being of adjustable distance apart.

The said conveyor can be of a different type, for example with straps (of adjustable distance apart), or of band type, for example in the form of an endless metal mesh band, or a reinforced fabric or plastic belt.

Figure 2:
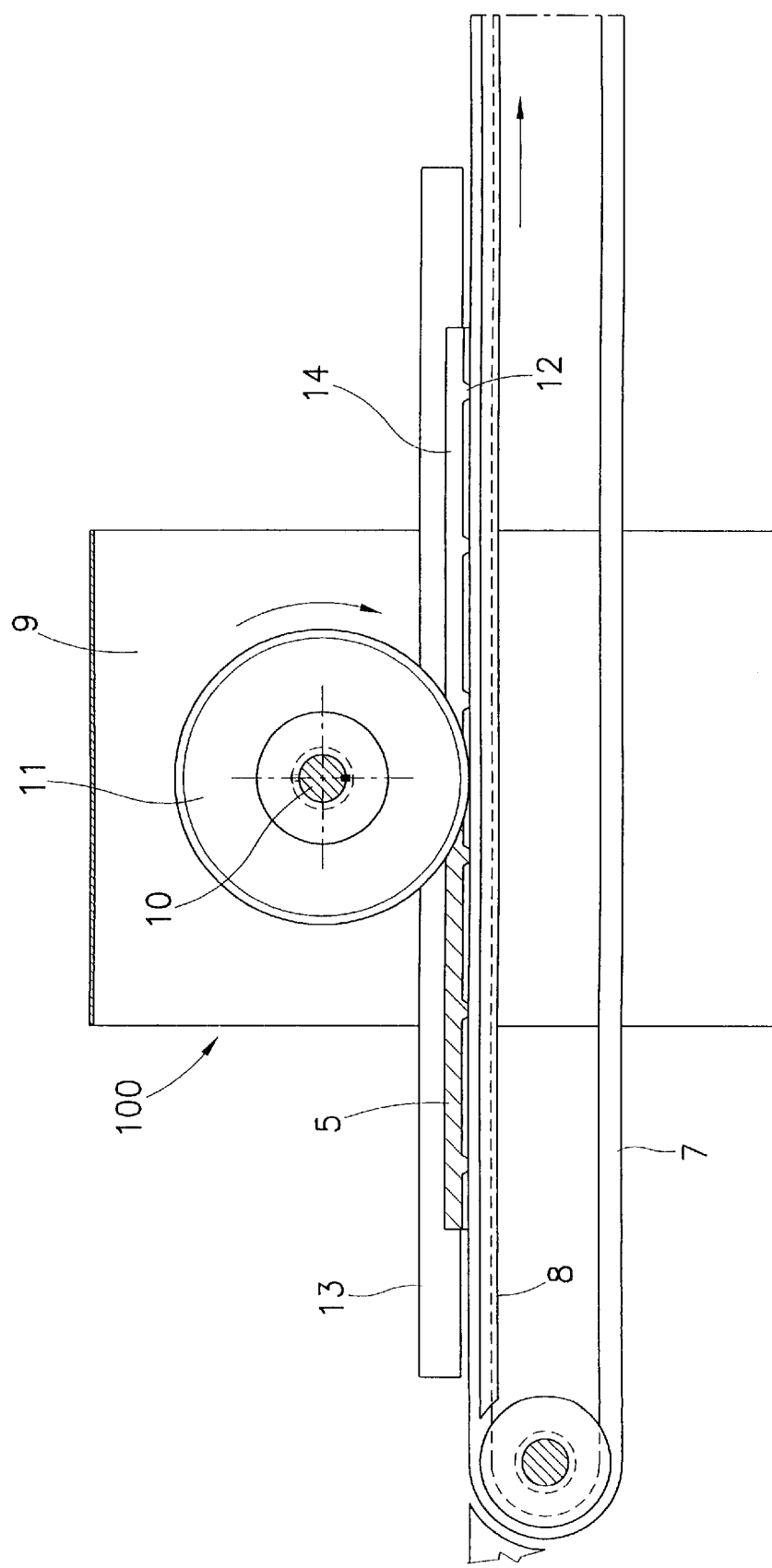
FIG. 2 is an enlarged view of part of the section II—II of FIG. 1.
Figure 3:
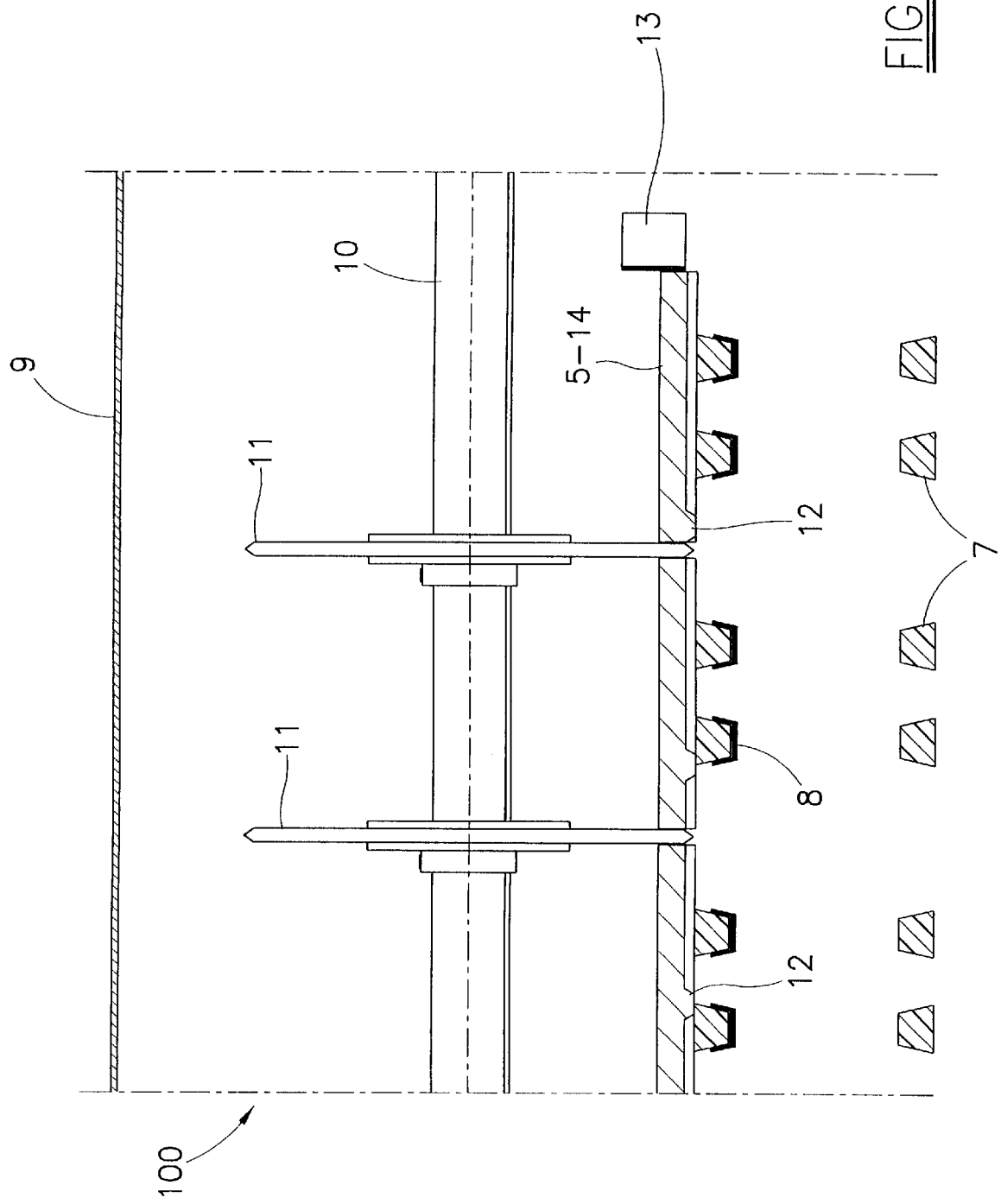
FIG. 3 shows part of the section III—III of FIG. 1.

The conveyor 7 has its upper or outward branches suitably supported, as shown at 8 in FIGS. 2 and 3.

As will be apparent hereinafter, the choice of type of conveyor 7 depends on the tools used for sectioning the panels 5 and/or on the dimensions of the tiles to be obtained by sectioning the panels 5.

Again with reference to FIG. 1, it will be seen that above the upstream end of the conveyor 7 there is a stationary sectioning unit 100 comprising a transverse structure 9 carrying a rotatable shaft 10.

The shaft 10 is rotated in the advancement direction of the panels 5 (see FIG. 2) by a motor unit 110 with an incorporated adjustable step-up gear, a series of cutting members being fixed onto the shaft 10 such that the distance between them can be adjusted.

In the embodiment shown in FIGS. 1 to 3 there are provided five equidistant cutting members, however both their number and their distribution can vary, as will be apparent hereinafter.

Each of the illustrated cutting members consists of a diamond-set wheel 11 with a pointed circumferential edge, its outer generating line being tangential to the lower face of the panel 5, or passing slightly beyond it.

In all cases, whatever the type of conveyor 7 used, whether strap or band, interference between the cutting member and the conveyor 7 is prevented by the presence of feet 12 (see FIGS. 2 and 3) formed on the lower face of the panel 5 at the moment of pressing.

Said feet 12 can consist either of suitably distributed small projections, or small mutually crossing ribs.

Said feet 12 can be omitted in the light of the aforestated, and possibly be replaced by equivalent means described hereinafter.

Said wheel 11 can have a different form than that stated, for example it can have a cylindrical outer circumferential edge.

Alternatively, the cutting members 11 can be circular blades with inserted teeth, such as carborundum or similar teeth.

The said cutting members, if wheels or circular blades, are rotated at high speed, of up to 20,000–30,000 r.p.m.

From tests carried out it has been found that a diameter of 80 to 300 mm and a thickness of 0.8 to 3 mm are suitable for sectioning panels of thickness between 9 and 15 mm.

Other cutting tools can be used, as stated hereinafter. With reference to FIG. 1, two opposing longitudinal guides 13 can be associated with the conveyor 7 for the sliding and retention of the lateral edges of the panels 5 in transit.

As shown, each panel 5 is sectioned into six tiles 14 in the form of large strips, which are then either fed as such to the subsequent operating stations, or are subjected to further sectioning as described hereinafter.

Figure 4:
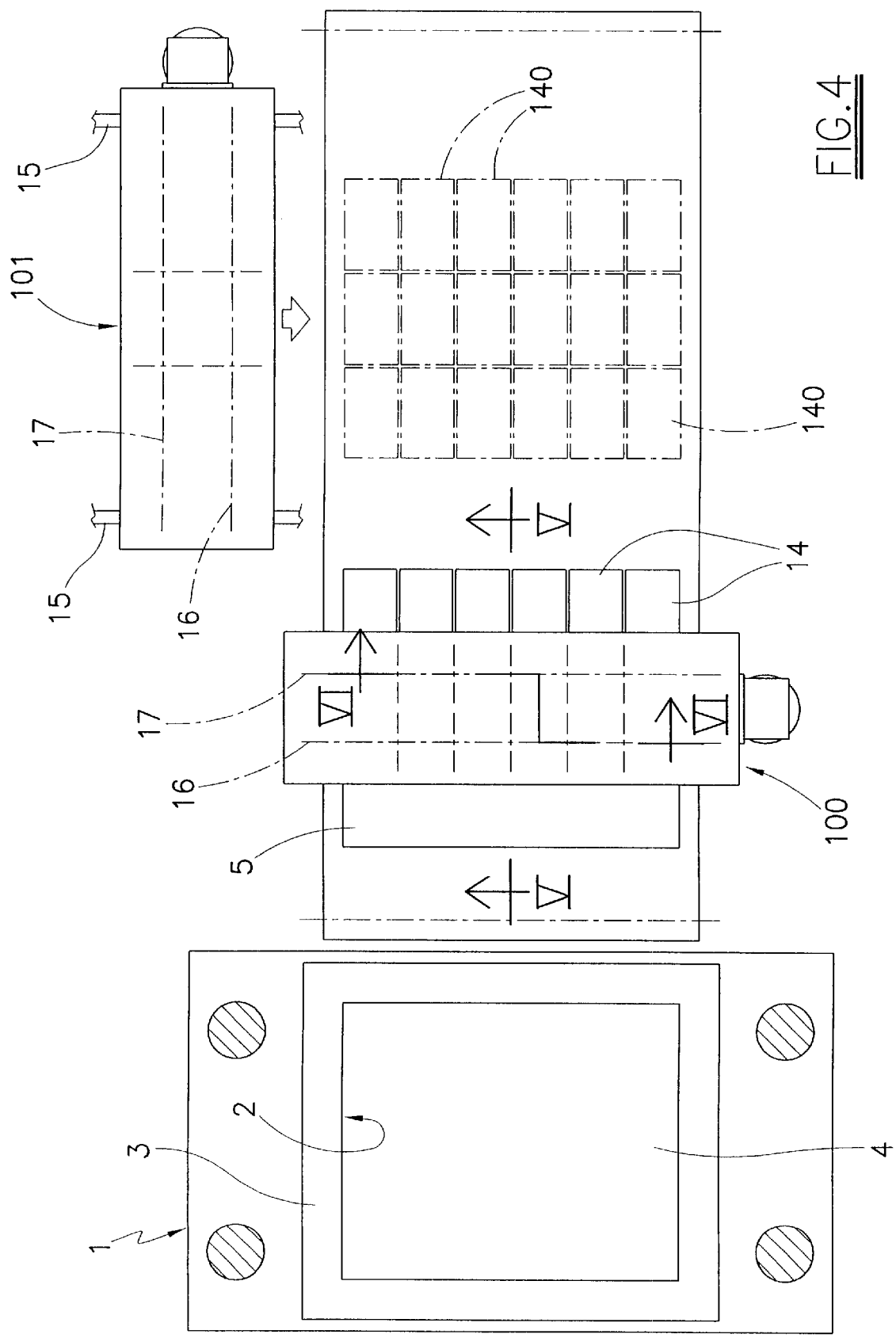
FIG. 4 is a schematic plan view, similar to FIG. 1, showing a second embodiment of the means of the invention.

In an alternative solution-shown in FIG. 4, a second sectioning unit 101 is associated with the conveyor 7, to lie parallel thereto.

The second sectioning unit 101 is structurally similar to the described sectioning unit 100, but with the difference that the second unit 101 is arranged to slide transversely to the conveyor 7, along the cylindrical bars indicated by 15.

The cutting tools associated with said sectioning units 100 and 101 can be of the aforedescribed type, or of the type described hereinafter with reference to FIGS. 4 to 6.

Each sectioning unit comprises two parallel horizontal transverse shafts rotated at high speed in the indicated direction, of which one, 16, carries fixed thereon a series of circular blades 160 (or wheels), and the other, 17, carries fixed thereon a second series of circular blades 170 (or wheels) coplanar with the preceding.

In the illustrated embodiment, said blades or wheels 160 and 170 are of constant thickness and have a cylindrical edge (FIG. 6).

Those blades or wheels 160 which act first on the panels 5 have a greater thickness and a smaller diameter than the blades or wheels 170.

Essentially, the blades 160 incise the surface of the panels 3 (see FIGS. 5 and 6), whereas the blades 170 separate those portions of the panel 5 defined by the previously formed incisions (grooves).

During production, the sectioning unit 100 divides the panel 5 into a series of tiles 14 while the conveyor is moving, whereas the sectioning unit 101 divides the tiles 14 into tiles 140 of smaller format (indicated by dashed and double dotted lines in FIG. 4) while the conveyor 7 is temporarily halted by the action of a suitable sensor such as a photo-electric cell.

In this respect, during the second cutting operation the sectioning unit 101 undergoes an outward travel stroke and halts temporarily, and then returns to its initial position after the conveyor 7 has been re-started and the tiles 140 removed.

Alternatively, the sectioning unit 101 can cut along both its outward and return travel, either on the same panel 5 after it has been suitably shifted, or on two consecutive panels, with possible drive reversal of the blades or wheels 170.

During their operation, the blades form respective upper sharp edges and respective underlying spacers 18 along the facing edges of adjacent portions of the panel 5.

It should be noted that the region in which the panels 5 are sectioned can operate dry or wet, there being provided suitable encasements, dust suppression and collection means, and means for filtering and recirculating the water used.

Figure 7:
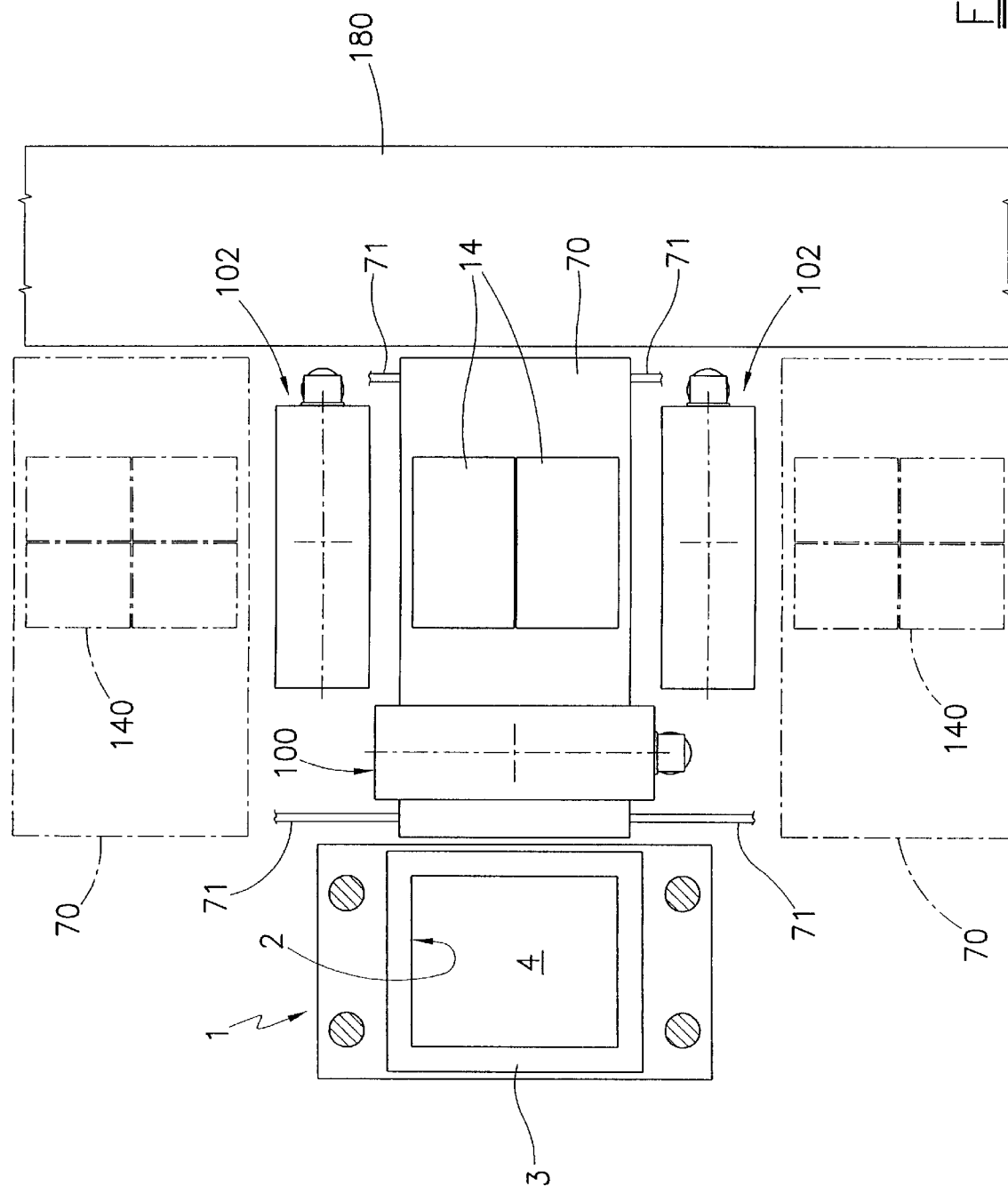
FIG. 7 is a plan view similar to FIG. 4, showing a variant of the means of the invention.

In the embodiment shown in FIG. 7, downstream of the press 1 there are a conveyor 70, a stationary sectioning unit 100 positioned upstream of said conveyor 70, two stationary sectioning units 102 positioned on one and the other side of the conveyor 70, and, for removing the tiles 140, a conveyor 180 positioned downstream of and transverse to the conveyor 70.

The aforegoing considerations are valid for the cutting tools associated with said sectioning units 100 and 102, and for the conveyors 70 and 180.

As can be seen, the conveyor 70 is mounted on transverse horizontal cylindrical bars 71 so that each time a series of tiles 14 obtained from a panel 5 by the action of the sectioning unit 100 is presented to it, it can be made to traverse to-and-fro beyond one and the other of said sectioning units 102.

This outward traversing proceeds to the positions indicated in FIG. 7 by dashed and dotted lines, and by dashed and double dotted lines respectively.

During said outward traversing, the conveyor 70 does not advance longitudinally, so that the corresponding sectioning unit 102 divides the tiles 14 into tiles 140 of smaller format.

After sectioning, the tiles.140 are fed to the conveyor 180, for example by a suitable pusher or by restarting the conveyor 70, after which the conveyor 70 is returned to its position aligned with the press 1.

Figure 8:
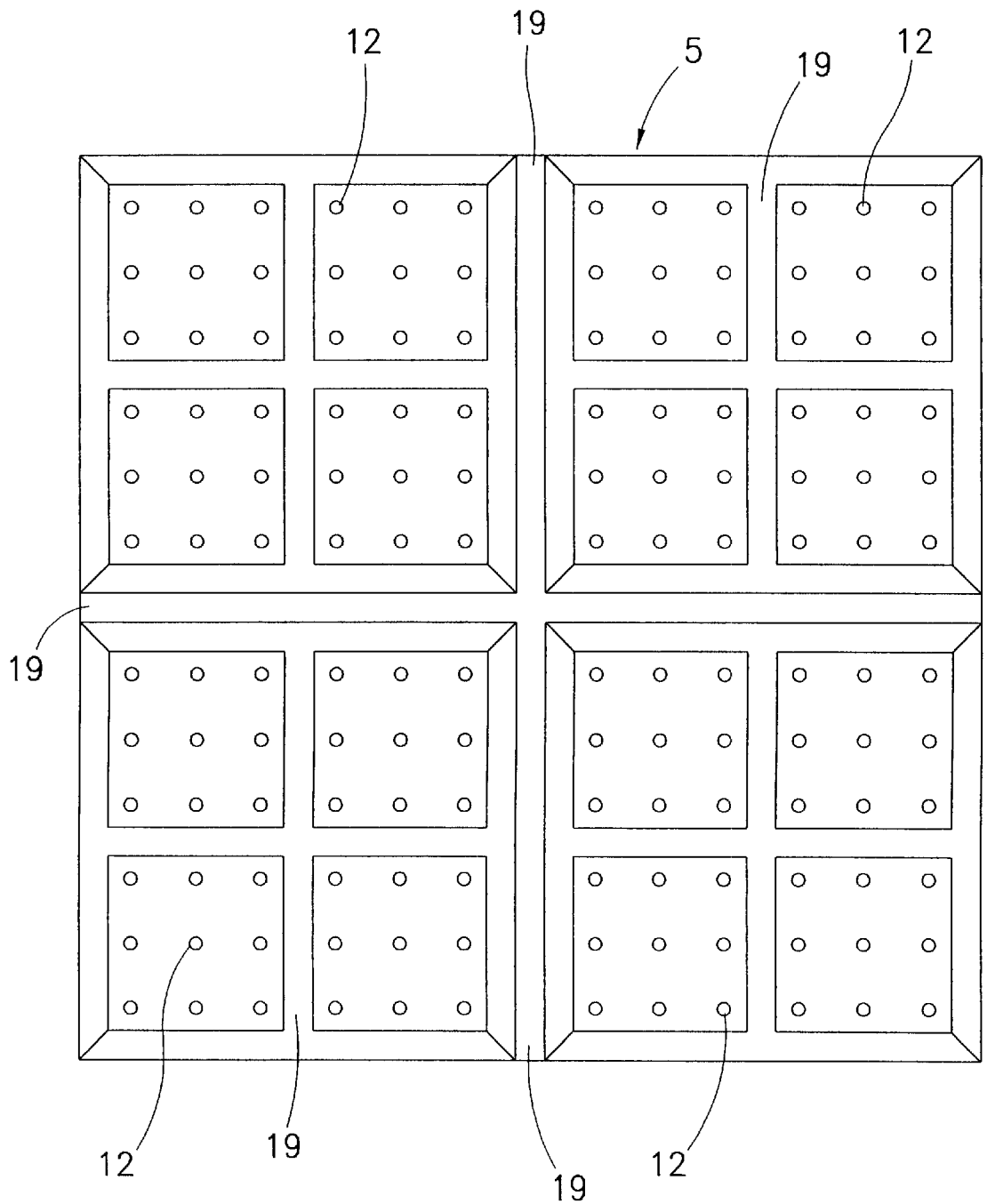
FIG. 8 is a plan view from below of a panel provided with a network of small crossing grooves forming the directrices for sectioning the panel.

With reference to the FIG. 8, to make the operations involved in sectioning less arduous, according to the invention it is advantageous to provide the lower face of the panel 5, during its formation, with a network of mutually crossing grooves 19 positioned along the cutting directrices followed by the sectioning units 100, 101, 102.

As stated previously, said grooves not only facilitate and accelerate the sectioning of the panel 5, but also enable the feet 12 to be dispensed with if considered appropriate.

In the illustrated embodiment said grooves 19 are parallel to the sides of the panel 5, however there is nothing to prevent them being orientated differently, as explained hereinafter.

The illustrated grooves 19 are straight, however they can be of other forms if particular sectioning means are used, as described hereinafter.

Figure 9:
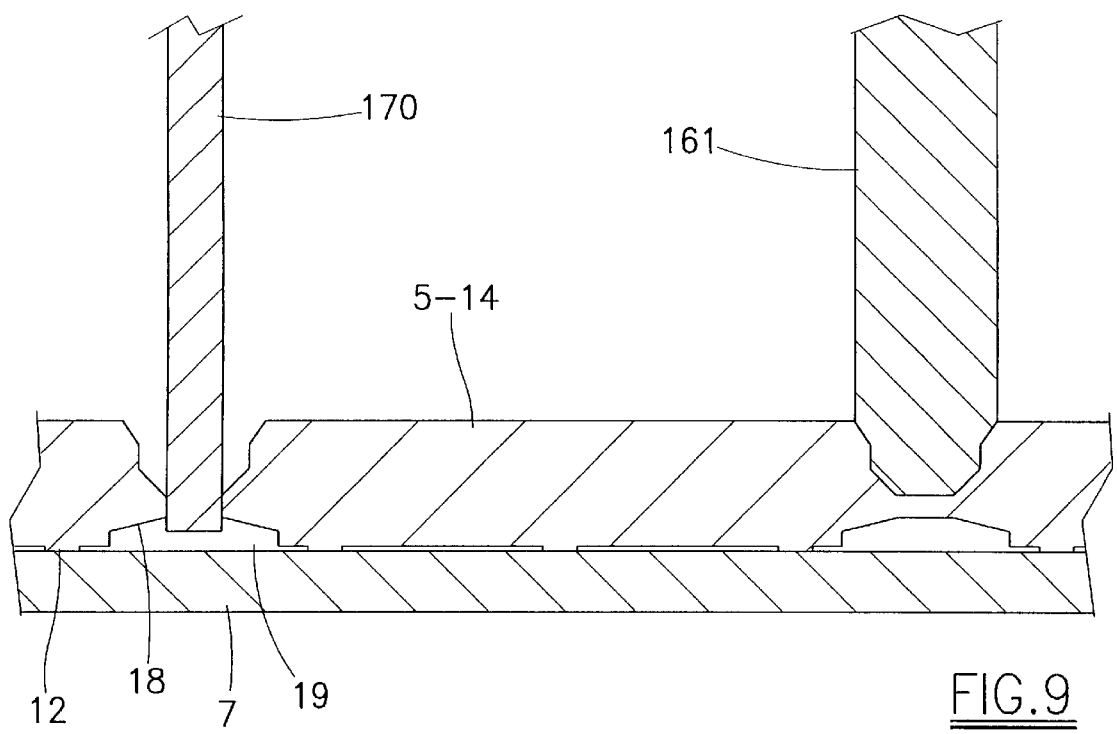
FIG. 9 is a section similar to FIG. 6, showing a stage in the sectioning of the panel of FIG. 8.

Said grooves 19 can also be seen in FIG. 9, which also shows an alternative embodiment of the wheels or circular blades of horizontal axis provided for surface incision of the panels 5.

In said alternative embodiment, the blade or wheel 161 has different thicknesses to enable its active profile to form edging along the total length of the sharp edges of the adjacent portions of the panel 5, this edging having the transvese shape of the peripheral edging of the starting panel 5.

The edging illustrated is merely an example, and can be obtained by means different from those already described, and to which reference will be made hereinafter.

Figure 10:
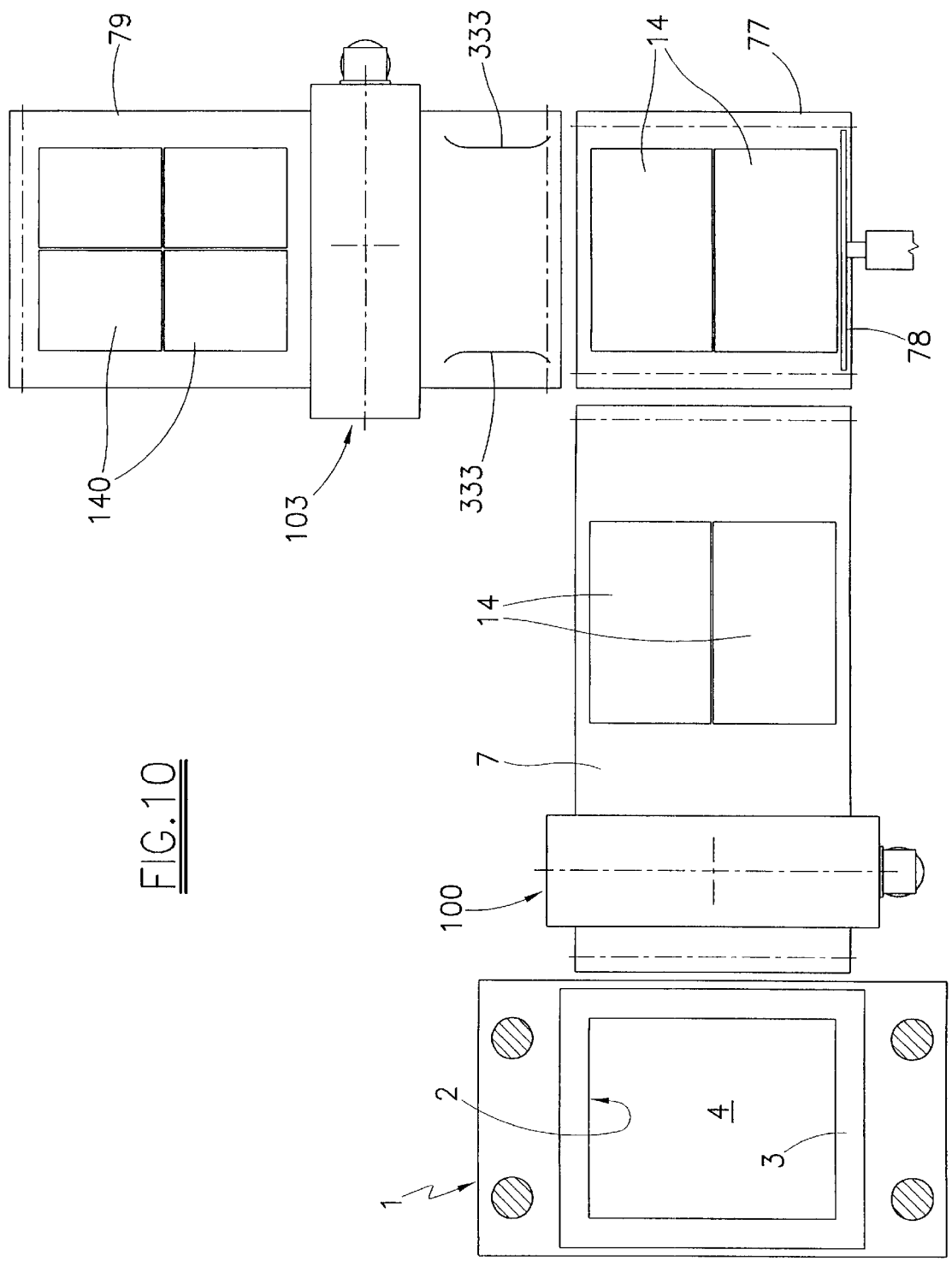
FIG. 10 is a schematic plan view, similar to FIG. 4, showing a further embodiment of the means of the invention.

The alternative embodiment of FIG. 10 comprises a conveyor 7 positioned downstream of the press 1, a first stationary sectioning unit 100 positioned above the upstream end of the conveyor 7, a service conveyor 77 aligned with this latter, a pusher 78 positioned on one side of said two in-line conveyors 7 and 77, a further conveyor 79 positioned on the other side of said in-line conveyors and perpendicular to them, and a second stationary sectioning unit 103 associated with said further conveyor 79.

With regard to said sectioning units 100 and 103 and the respective cutting members, reference should be made to that stated heretofore.

The operation of this last embodiment is apparent. The tiles 14 obtained from the panel 5 pass from the conveyor 7 to the conveyor 77, which is then halted. The pusher 78 feeds the tiles 14 to the next conveyor 79, inserting them between two aligning guides 333 of adjustable distance apart, and finally the conveyor 79 advances the tiles 14, which are transformed into tiles 140 of smaller format by the sectioning unit 103.

In addition to the already described cutting tools, the invention can use other cutting means.

Figure 11:
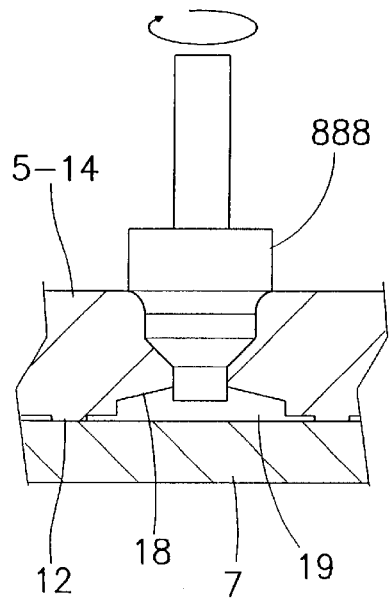
FIG. 11 is a sectional elevation showing an alternative embodiment of the mechanical cutting tool.

For example the panel 5 can be sectioned, with simultaneous formation of said edging and said spacer 18, by one or more narrow grinding wheels 888 (see FIG. 11) of vertical axis, each rotated about itself by a right-angled transmission, the input motion of which is derived from a common motor unit.

Figure 12:
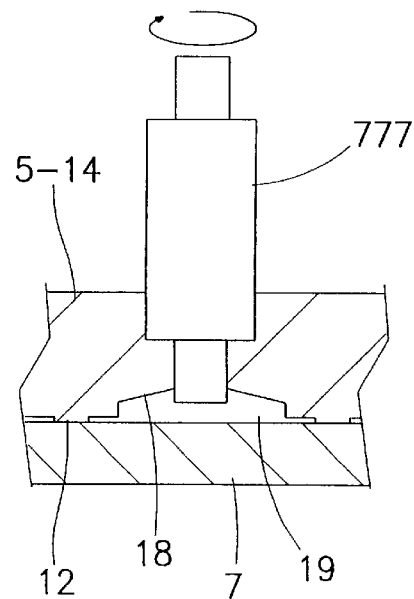
FIG. 12 is a view similar to the preceding showing a further embodiment of the mechanical cutting tool.

Alternatively, narrow milling cutters 777 (see FIG. 12) also of vertical axis can be used.

Figure 13:
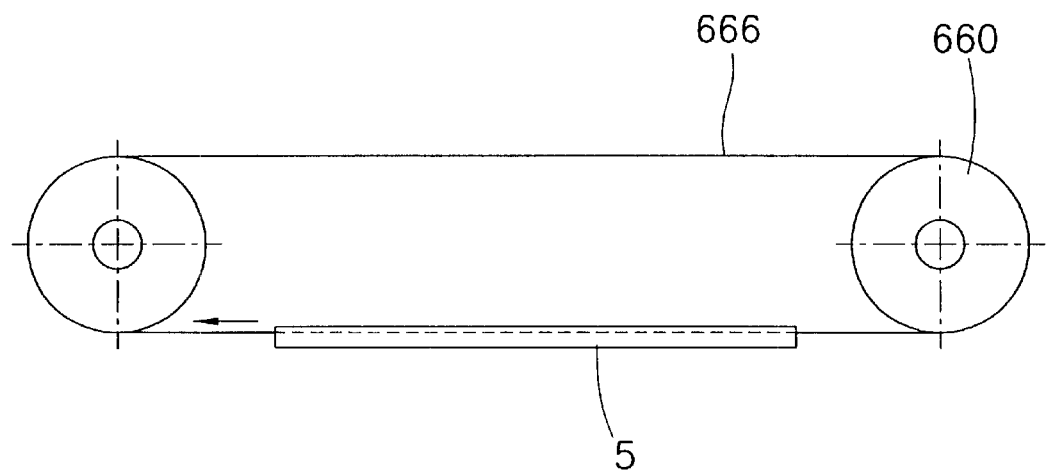
FIG. 13 is a view similar to the preceding showing a further embodiment of the mechanical cutting tool.

Again, said further mechanical sectioning means can be cutting devices of cutter type such as that shown in FIG. 13.

This comprises a wire 666 passing endlessly about two pulleys 660 of horizontal axis, one of said pulleys being suitably motorized, the pulleys being supported by a vertically slidable structure.

Figure 14:
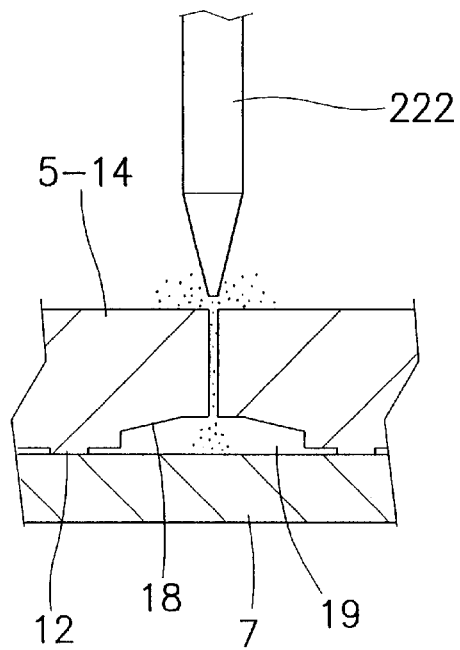
FIG. 14 is a view similar to the preceding showing a fluid-operated cutting tool.

The panels 5 can also be sectioned by cutting devices of fluid type, see FIG. 14, typically consisting of nozzles 222 connected to a source of fluid at high pressure, such as air or water.

A fine powder of highly abrasive material such as sand, ground tile or other similar material is preferably mixed with said fluid.

In a sectioning unit of the invention the nozzles 22 can be used either alone or in combination with the aforesaid means for surface-incising the panels 5, typically said milling cutters or grinding wheels of vertical axis.

The use of said nozzles 222, whether or not in combination with said milling cutters or grinding wheels of vertical axis, enables curved or mixed-line cuts of various shapes to be made.

For this purpose the nozzle (or nozzles) is used on a moving assembly of pantograph type under the control of an electronic control device, enabling a tile of the desired special format to be cut from the panel 5.

Said electronically controlled moving assembly can operate with the panel 5 either at rest or temporarily stationary or in movement.

It is evident that the means of the aforegoing description are highly versatile in use, they being able to be combined in still further ways, depending on the required results.

Three procedures which can be effected in accordance with the invention will now be described.

Figure 15:
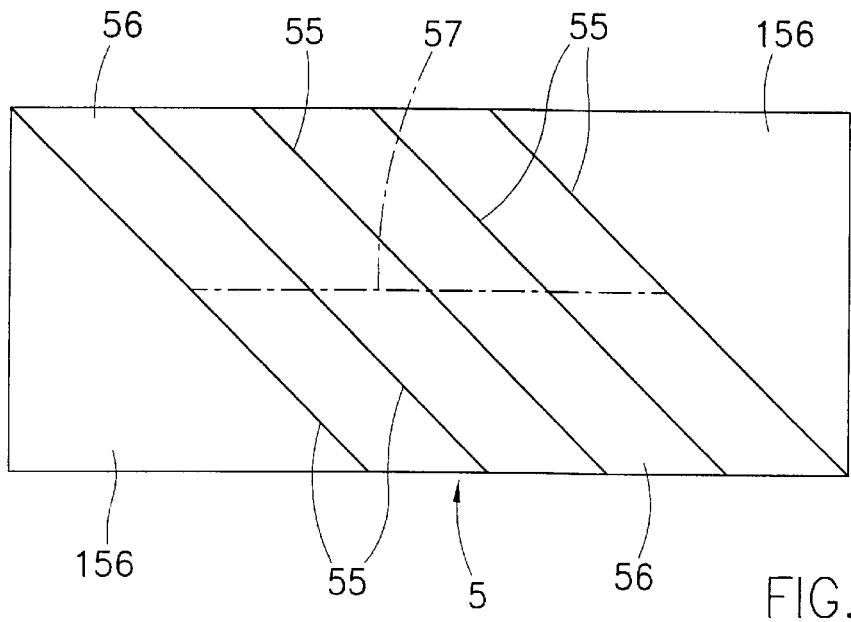
FIG. 15 is a plan view of a large starting panel showing the respective cutting directrices followed by the sectioning means of the invention.

Starting with a rectangular panel 5, see FIG. 15, a series of cuts 55 are made to obtain four lozenge shaped tiles 56 and two triangular tiles 156.

The cuts 55 can be made with a sectioning unit similar to that indicated by 100, after suitably rotating the starting panel 5, or they can be made with a sectioning unit arranged to travel in a direction inclined to the direction in which the panels 5 arrive.

The tiles 56 can be fed to subsequent processing or be sectioned along the directrix 57 to obtain two shorter tiles from each of said lozenge-shaped tiles 56.

Figure 16:
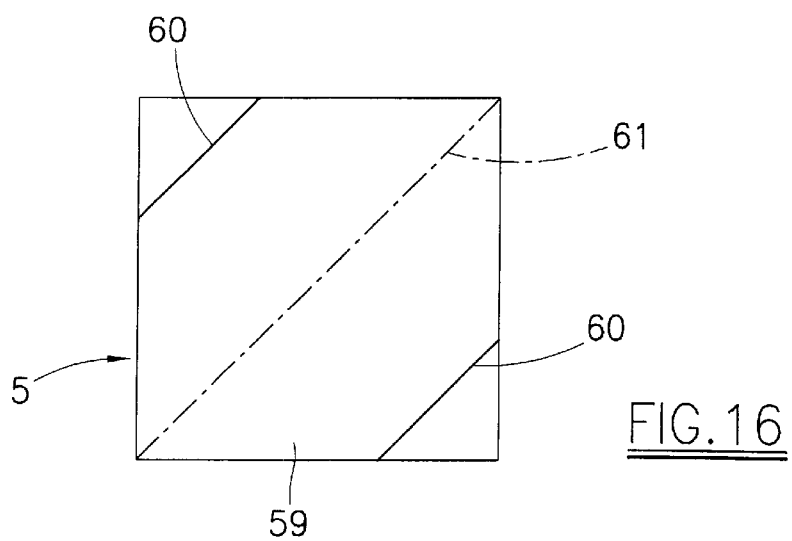
FIG. 16 is a view similar to the preceding showing a further starting panel with respective cutting directrices.

FIG. 16 starts with a large square tile 5, from which a large hexagonal tile 59 is obtained by cuts 60 made for example by the method described with reference to FIG. 15.

The hexagonal tile 59 can either be fed to subsequent processing or be further sectioned along the directrix 61 to obtain two tiles of trapezium shape.

The starting panels 5 can have a shape other than square or rectangular, for example lozenge or hexagonal shape.

Figure 17:
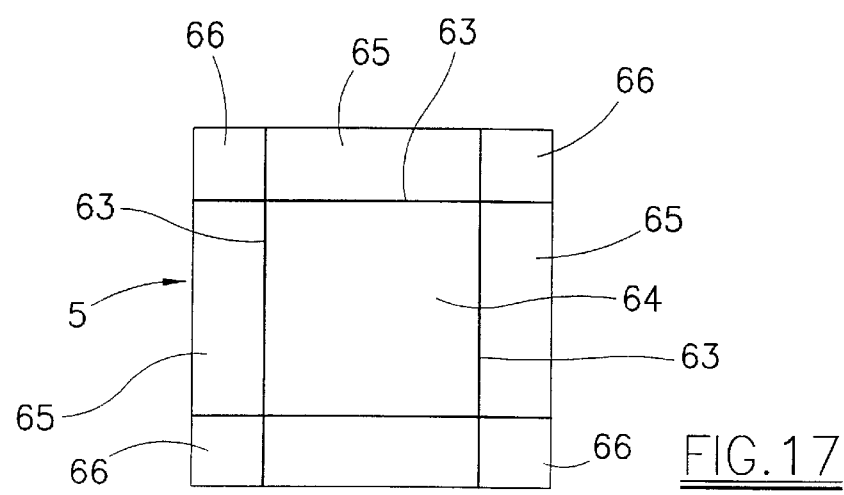
FIG. 17 is a view similar to the preceding showing a further starting panel with respective cutting directrices.

Finally, in FIG. 17 a large starting panel 5 is sectioned by cuts 63 to obtain a central square tile 64, four edge strips 65, and four square corner pieces 66.

The panels 5 could also be subjected to total or partial drying prior to sectioning.

Said drying can be achieved either by providing a specific dryer immediately downstream of the press 1, or by using the usual drying section of the ceramic manufacturing works itself.

The merits and advantages of the invention, coupled with its considerable versatility, are clear from the aforegoing and from the accompanying figures.

The invention is not limited to that illustrated and described, but also comprises all technical equivalents of the described means and their combinations, if implemented within the context of the following claims.

What is claimed is:

1. A method for manufacturing tiles of different formats, comprising the steps of:

dry-forming a single panel within a ceramic mold by compressing at least one ceramic material in powder form; and separating from said single panel at least two tiles having the desired format by at least one cutting operation, said at least one cutting operation being carried out after said dry-formation but before a firing process of said single panel; wherein said at least one cutting operation results in a simultaneous formation of small projections along a total length of lower facing edges of a cut from said cutting operation.

2. The method according to claim 1 wherein said at least one cutting operation is a mechanical cutting operation having a first stage in which the surface of the panel is incised and a second stage in which the panel is cut through.

3. The method according to claim 1, wherein said at least one separating step comprises a stage in which the panel surface is incised with an incision by mechanical cutting means and a stage in which the panel is cut through by fluid cutting means.

4. The method according to claim 3, wherein said surface incision stage includes the simultaneous formation of respective edging or bevels along a plurality of upper sharp edges of the incision.

5. The method according to claim 1, wherein the dry-forming of the panel includes the simultaneous formation of at least one groove in the lower face of the panel, said at least one groove being formed along a line along which said at least one tile is separated.

* * * * *